United States Patent [19]

Kozaki et al.

[11] Patent Number: 5,500,851
[45] Date of Patent: Mar. 19, 1996

[54] FIXED-LENGTH PACKET SWITCHING SYSTEM ADAPTED FOR FUNCTION TEST

[75] Inventors: Takahiko Kozaki, Koganei; Nobuhiro Horie, Fujisawa; Kenichi Asano, Akishima, all of Japan

[73] Assignees: Hitachi, Ltd.; Hitachi ULSI Engineering Corp., both of Tokyo, Japan

[21] Appl. No.: 297,566

[22] Filed: Sep. 1, 1994

[30] Foreign Application Priority Data

Sep. 1, 1993 [JP] Japan ............................. 5-217203

[51] Int. Cl.⁶ .......................... H04J 1/16; H04L 12/56
[52] U.S. Cl. ............................. 370/13; 370/60.1
[58] Field of Search .................... 370/13, 14, 15, 370/16, 60, 61, 66, 68, 60.1, 94.1; 379/10, 11, 15, 16; 371/20.1, 20.4, 20.5, 24, 27

[56] References Cited

U.S. PATENT DOCUMENTS

| | | | |
|---|---|---|---|
| 4,958,345 | 9/1990 | Fujisaki | 371/27 |
| 5,124,977 | 6/1992 | Kozaki et al. | 370/60 |
| 5,184,346 | 2/1993 | Kozaki et al. | 370/60 |
| 5,214,639 | 5/1993 | Herion | 370/60 |
| 5,251,204 | 10/1993 | Izawa et al. | 370/14 |
| 5,280,469 | 1/1994 | Taniguchi et al. | 370/13 |
| 5,349,578 | 9/1994 | Tatsuki et al. | 370/13 |
| 5,351,232 | 9/1994 | Yamashita | 370/14 |
| 5,365,519 | 11/1994 | Kozaki et al. | 370/60 |

*Primary Examiner*—Douglas W. Olms
*Assistant Examiner*—Chau T. Nguyen
*Attorney, Agent, or Firm*—Antonelli, Terry, Stout & Kraus

[57] ABSTRACT

An ATM exchanger includes a plurality of switch units connected in multiple stages, in which a circuit is provided for writing a test cell pattern into and reading it from a buffer memory of each switch unit in accordance with an instruction from a controller, so that the test cell read from the buffer memory can be transferred appropriately to the controller.

20 Claims, 15 Drawing Sheets

FIG. I

FIXED-LENGTH PACKET SWITCHING SYSTEM ADAPTED FOR FUNCTION TEST

CROSS-REFERENCE TO RELATED APPLICATIONS

The present application relates to a U.S. patent application entitled "ATM Switching System and Cell Control Method" by Takahiko KOZAKI et al. Ser. No. 08/294,496, filed Aug. 23, 1994 and assigned to the present assignees, based on a Japanese Patent Application No. 5-210179 filed an Aug. 25, 1993, the contents of which are incorporated herein by reference.

BACKGROUND OF THE INVENTION

The present invention relates to a switching system, or more in particular, to a fixed-length packet switching system with the test function for maintenance suitable for the speech path module or the like of the broadband ISDN exchanger.

A switching system for handling fixed-length packets (hereinafter referred to as "the cells") generally comprises a switch including a plurality of input and output ports for distributing input cells among output ports according to the destination, a plurality of line interfaces for transferring the cells received from input lines to said input ports and the cells output from the switch output ports to output lines, and a controller for controlling the switch and the line interfaces.

In a method for testing the normality of the switching function of this type of switching system, for example, a test cell generated by the controller is input to one of the input ports of the switch. The switch transfers the test cell to a given line interface circuit, which is operated to loop back the test cell from the output line to the input line and input to the switch again. The switch is thus caused to transfer the test cell to the controller so that the controller checks whether the test cell has been received.

According to this method, the routing function for each output port of the switch and the function of each line interface circuit can be inspected by rewriting the routing information set in the header of the test cell.

Nevertheless, the problem of this method when applied to a switching system with a plurality of switch units connected in multiple stages is that in the case where the test cell cannot be received by the controller or the controller receives an abnormal cell, it is difficult to discover which switch unit of the multistage switch structure has a fault. There have been related art such as U.S. Pat. Nos. 5,124,977 and 5,184,346 both entitled "Switching System" in relation to ATM Switching System using common buffer memory.

SUMMARY OF THE INVENTION

An object of the invention is to provide a test method particularly suitable for a switching system having a multi-stage-connection structure.

Another object of the invention is to provide a novel switching system having a structure suitable for the function test.

In order to achieve the above-mentioned objects, there is provided according to the invention a switching system comprising a buffer memory of each switch unit for temporarily storing the cells, wherein a test cell is written into or read from the buffer memory in compliance with an instruction from the controller so that the test cell can be transferred to the controller directly or through a switch unit in subsequent stages.

More specifically, the switching system according to this invention comprises a switch including a plurality of input ports and output ports, a plurality of line interface circuits for transferring the ATM cells received from input lines to the input ports of the switch and transferring the ATM cells output from the output ports of the switch to output lines, and control means for controlling the switch and the line interface circuits, wherein the switch includes a buffer memory for temporarily storing the ATM cells, means for writing a test ATM cell in a specified address of the buffer memory, and means for reading the test ATM cell from the buffer memory in accordance with an instruction of the control means.

The read means includes means for transferring the ATM cells read from a designated address of the buffer memory in the switch to the control means in accordance with an instruction from the control means.

According to a first embodiment of the invention, the read means includes means for reading the ATM cells continuously from the buffer memory in the switch in accordance with an instruction from the control means.

Also, the switch includes a multiplexer for multiplexing the ATM cells input from a plurality of input ports and supplying them to the buffer memory, a demultiplexer for distributing the ATM cells read from the buffer memory among the output ports, and a buffer controller for analyzing the header of each ATM cell output from the multiplexer and generating a write address and a read address for accessing the buffer memory.

According to this invention, a test cell can be written into or read from the buffer memory of a given switch unit in accordance with an instruction from the controller. The test cell is read and received and regenerated by the switch unit in the next stage. In this way, the normalcy of the function can be inspected for each switch unit. It is thus possible to easily find a faulty switch unit.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1:
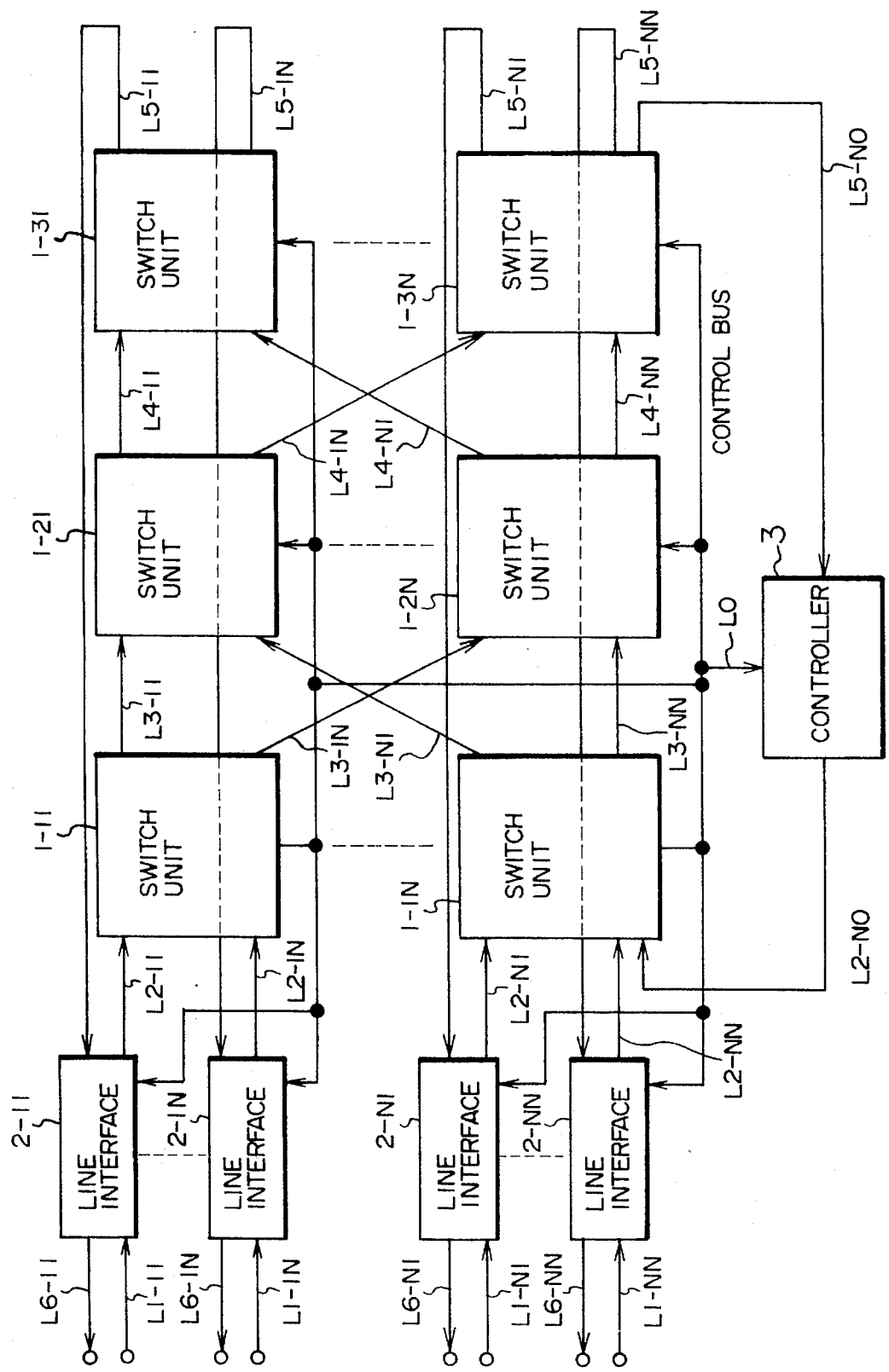
FIG. 1 is a diagram showing the configuration of an ATM switching system including a plurality of switch units according to an embodiment of the invention.

FIG. 1 shows an example of the configuration of an ATM switching system comprising a plurality of switch units connected in multiple stages according to this invention.

The switching system comprises a plurality of switch units 1 (1-11 to 1-3N), a plurality of line interface circuits 2 (2-11 to 2-NN) and a controller (control circuit) 3. In this example, the switch includes a number 3N of switch units connected in three stages each with N switch units.

Character L1 (L1-11 to L1-NN) designates input lines, L6 (L6-11 to L6-NM) output lines, L2 (L2-11 to L2-NN) lines providing input ports of the switch, L3 (L3-11 to L3-NN) to L4 (L4-11 to L4-NN) lines for connecting the switch units, and L5 (L5-11 to L5-NN) lines providing output ports of the switch.

In the normal operation mode, the user cells input from a given input line L1-$ij$ is subjected to cell synchronization, header conversion or other processings required for line adaptation at the line interface circuits 2-$ij$, and then input from the line L2-$ij$ to the switch unit 1-1$i$ of the first stage.

In the first-stage switch 1-1$i$, according to the routing information indicated by the routing header of an input cell, the input cell is distributed to one of the output lines L3-$ik$, and is then transferred to one of the switch units 1-3$p$ in subsequent stages by the second-stage switch unit 1-2$k$ through a similar operation. The switch unit 1-3$p$ in the last stage (third stage) outputs the input cell to the line L5-$pq$.

The above-mentioned cell is transferred to the output line L6-$pq$ through the line interface circuit 2-$pq$ connected to the line L5-$pq$.

The routing information is set in the cell for call processing and other control of the ATM switching system in such a manner that the cell is transferred from a given line L2-$ij$ through the first- and second-stage switch units to the switch unit 1-3N and output to the output line L5-N0 connected to the controller 3.

The control cell generated from the controller 3 is output to the line L2-N0, and after being input to the switch unit 1-1N, transferred through the second-stage switch unit 1-2$k$ to the third-stage switch unit 1-3$p$. This cell is then distributed to the line L5-$pq$ of a given output port, and output through the line interface circuit 2-$pq$ to the output line L6-$pq$.

The controller 3 controls the switch units 1-11 to 1-3N and the line interface circuits 2-11 to 2-NN through the control bus L0.

Figure 14:
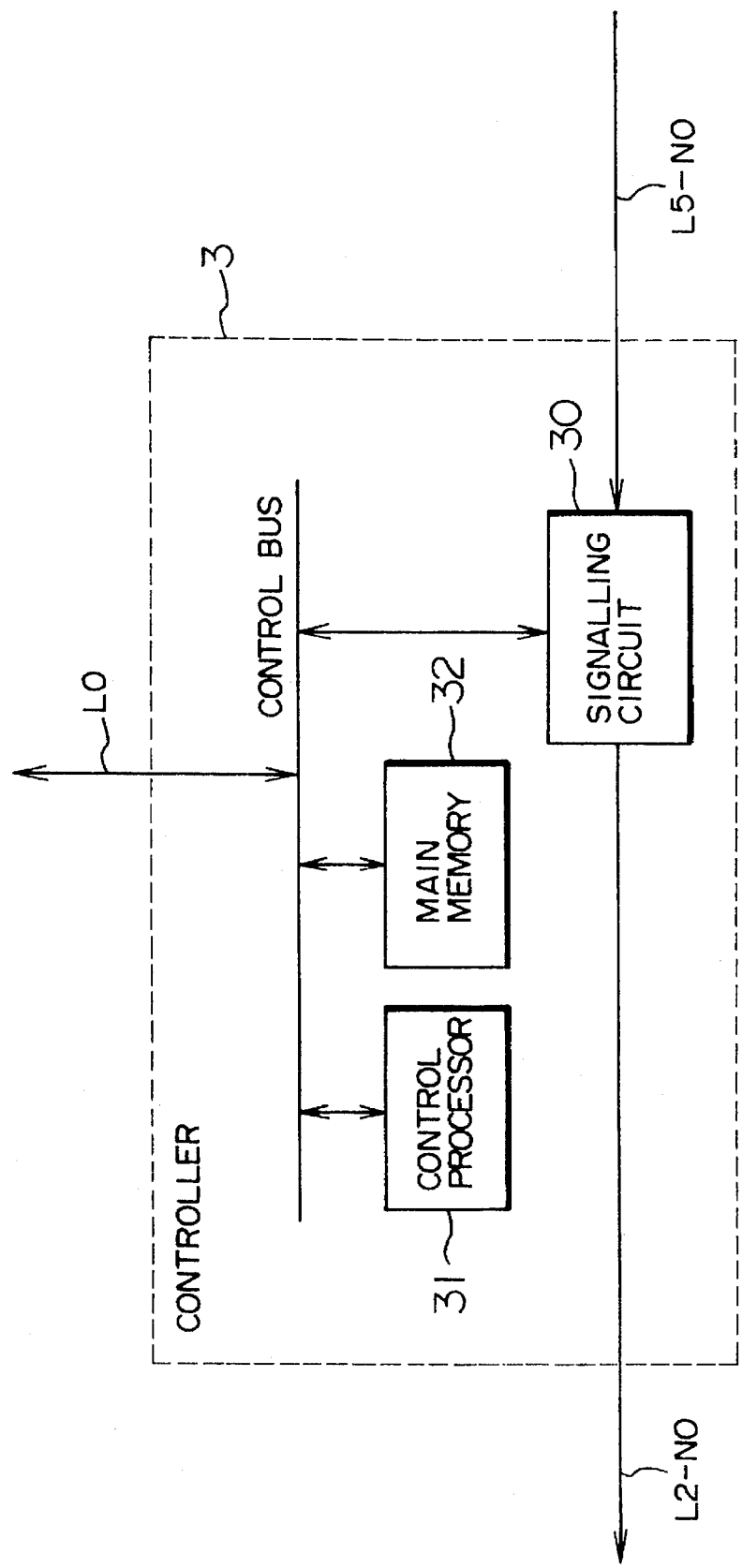
FIG. 14 is a diagram showing a controller 3 according to an embodiment.

A specific example of the configuration of the controller 3 is shown in FIG. 14.

The controller 3 includes a signalling circuit 30 connected to the control cell input line L2-N0 of the first-stage switching unit and the control cell output line L5-N0 of the last-stage switch unit, a control processor 31, a main memory 32 and a control bus L0 connecting these elements.

The control cell containing the information for controlling the ATM switching system including the call processing information is input to the line L5-N0, stored temporarily in the signalling circuit 30, and assembled into a control message.

The control processor 31 accesses the signalling circuit 30 through the control bus L0, receives a control message from the signalling circuit 30, and in accordance with the contents of the control message, controls the switch units 1-11 to 1-3N or the line interface circuits 2-11 to 2-NN.

When communicating with other switching systems or subscribers, the control processor 31 sends a control message to the signalling circuit 30. This control message is output as a control cell to the line L2-N0 from the signalling circuit 30, and sent out to an output line through the switch units 1-21 to 1-2N and 1-31 to 1-NN from the switch unit 1-1N.

The main memory 32 is for holding various programs executed by the control processor 31, and the information, a control table, etc., controlled by the control processor 31.

In the ATM switching system shown in FIG. 1, a method for detecting the presence or absence of a fault consists in providing the cell loop back function in the line interface circuits 2-11 to 2-NN and generating a test cell from a controller.

The cell loop back function is such that the test cell received by the line interface circuits 2-11 to 2-NN from the last-stage switch units 1-31 to 1-3N is returned to the first-stage units 1-11 to 1-1N. For example, this function is to output the test cell input from the line L5-11 to the line L2-11 in the case of the line interface circuit 2-11. Using this function to advantage can detect the presence or absence of a fault of each of the switch units 1-11 to 1-3N.

Assuming for example that the switch unit 1-31 is faulty. The fault can be detected by supplying the test cell from the controller 3 through the line L2-N0, the switch unit 1-1N, the line L3-N1, the switch unit 1-21, the line L4-11, the switch unit 1-31, the line L5-11, the line interface circuit 2-11, the line L2-11, the switch unit 1-11, the line L3-11, the switch unit 1-21, the line L4-1N, the switch unit 1-3N and the line L5-N0 in that order.

This test method, however, cannot directly decide that the fault has occurred in the switch 1-31 even if the fault can be known to have occurred at a part of the route of test cell flow in the case where the test cell fails to return to the controller.

In order to locate the fault point, it is unavoidable to conduct the cell transfer test on a plurality of different routes and estimate the fault location from the combination of the routes in trouble. This considerably complicates the function test.

According to the invention, each switch unit 1-11 to 1-3N is provided with the function of generating and confirming the reception of a test cell. The controller 3 can thus selectively instruct the switch units 1-11 to 1-3N through the control bus L0 to make a report on the generation and receiving of a test cell.

Assuming for example that the switch unit 1-11 is caused to output a test cell to all the output lines L3-11 to L3-1N, and the second-stage switch units 1-21 to 1-2N are checked for reception of the test cell. The normalcy of the route of cell generation in the switch unit 1-11 and the cell receiving route in the lines L3-11 to L3-1N and the switch units 1-21 to 1-2N can be confirmed.

Suppose all the second-stage switch units 1-21 to 1-2N indicate an abnormality in test cell reception. It is decided that a fault lies in the cell generating route of the switch unit 1-11 providing a test cell source.

In the case where only a specific one of the second-stage switch units, say, the switch unit 1-21 exhibits a receiving abnormality, on the other hand, a fault is considered to lie in the output route of the switch unit 1-11 to the line L3-11, in the line L3-11 itself, or in the cell receiving route from the line L3-11 of the switch unit 1-21.

This method facilitates the confirmation of the state of the respective output routes from the first-stage switch units 1-11 to 1-1N to the second-stage switch units 1-21 to 1-2N and the confirmation of the state of the respective routes from the second-stage switch units 1-21 to 1-2N to the last-stage switch units 1-31 to 1-3N.

Also, assuming that the first-stage switch 1-11 is required to confirm the receipt of a test cell generated from a specific switch in the last stage, say, 1-31, for example. The line interface circuit 2-11 connected to these two switch units is set to a received output cell loop back mode so that the lines L5-11 and 2-11 are substantially connected to each other.

When a test cell is output from the switch unit 1-31 to the line L5-11 under this condition, it is possible to check the route from the switch 1-31, the line L5-11, the line interface circuit 2-11, the line L2-11 to the switch 1-11. In similar fashion, the state of the route from the last-stage switch units 1-31 to 1-3N to the first-stage switch units 1-11 to 1-1N can be easily confirmed.

Further, a function provided in each of the line interface circuits 2-11 to 2-NN for generating a 12 test cell and confirming the reception of the test cell can detect a fault, if any, in the route between these line interface circuits and the switches.

Assuming for example that a test cell is generated from the line interface circuit 2-11 and the reception of the test cell at the switch unit 1-11 is confirmed. The normalcy of the test cell transfer route in the line interface circuit 2-11, the line L2-11 and the cell input route from the line L2-11 in the switch unit 1-11 can be easily confirmed.

Figure 15:
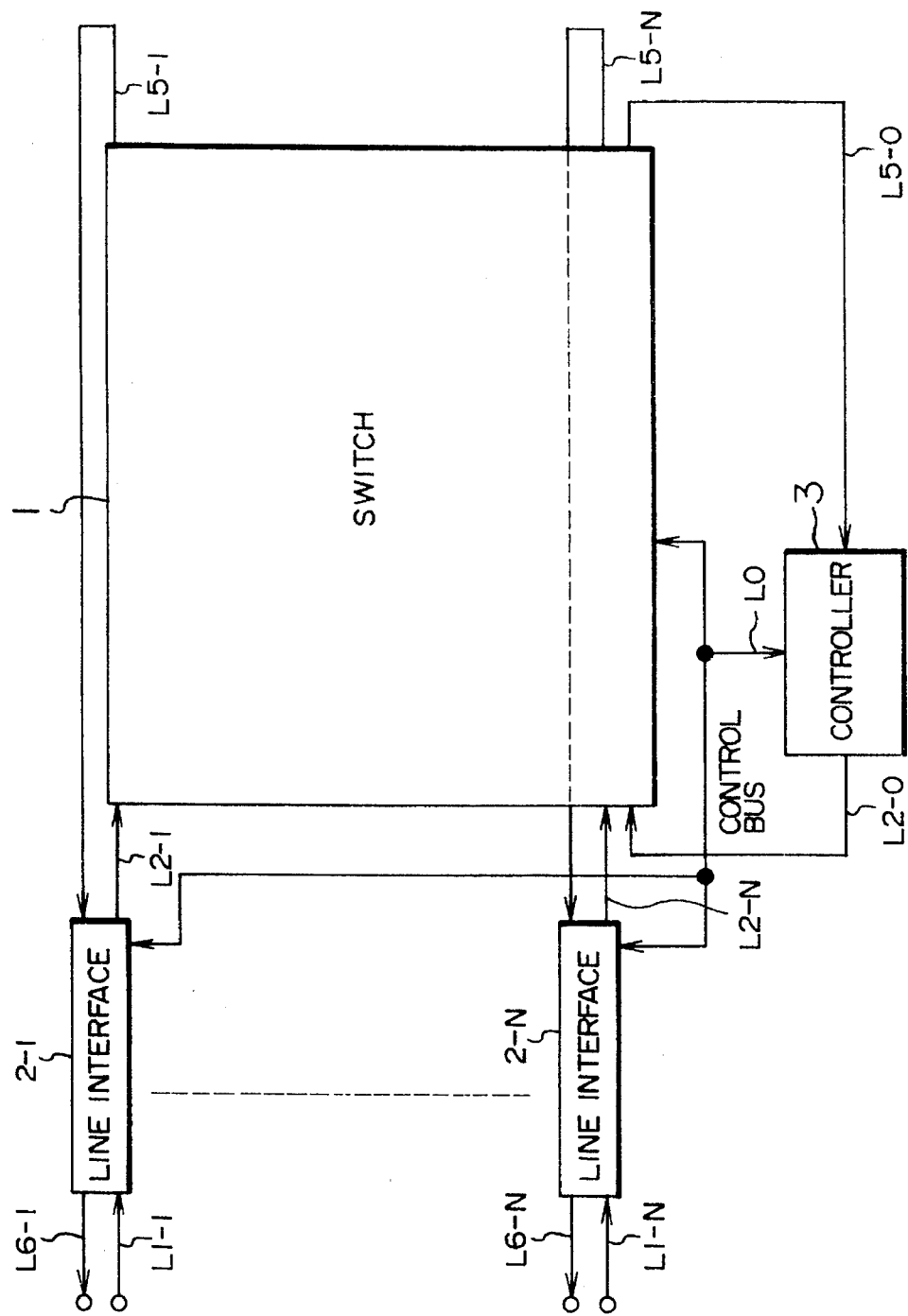
FIG. 15 is a diagram showing an ATM switching system according to another embodiment.

The above-mentioned method for confirming a fault route according to the invention is effectively applied also to a switching system comprising a single switch unit as shown in FIG. 15.

For example, assuming that a test cell is generated from a switch unit 1, and in order to confirm the reception of the test cell, only the line interface circuit 2-1 is caused to loop back the test cell with the line L5-1 and the line L2-1 substantially connected to each other. Then the output route of the switch unit 1, the line L5-1, the line interface circuit 2-1, the line L2-1 and the input route of the switch unit 1 can be checked.

Further, if a function is provided for generating a test cell and confirming the test cell reception also in the line interface circuits 2-1 to 2-N, a fault, if any, in the route between the switching units and each line interface circuit can be detected.

The test method according to the invention described above, as compared with the method in which a test cell is generated from a controller which in turns confirms the reception of the test cell, considerably facilitates the work of locating the point of fault as well as detecting the presence or absence of a fault.

Figure 2:
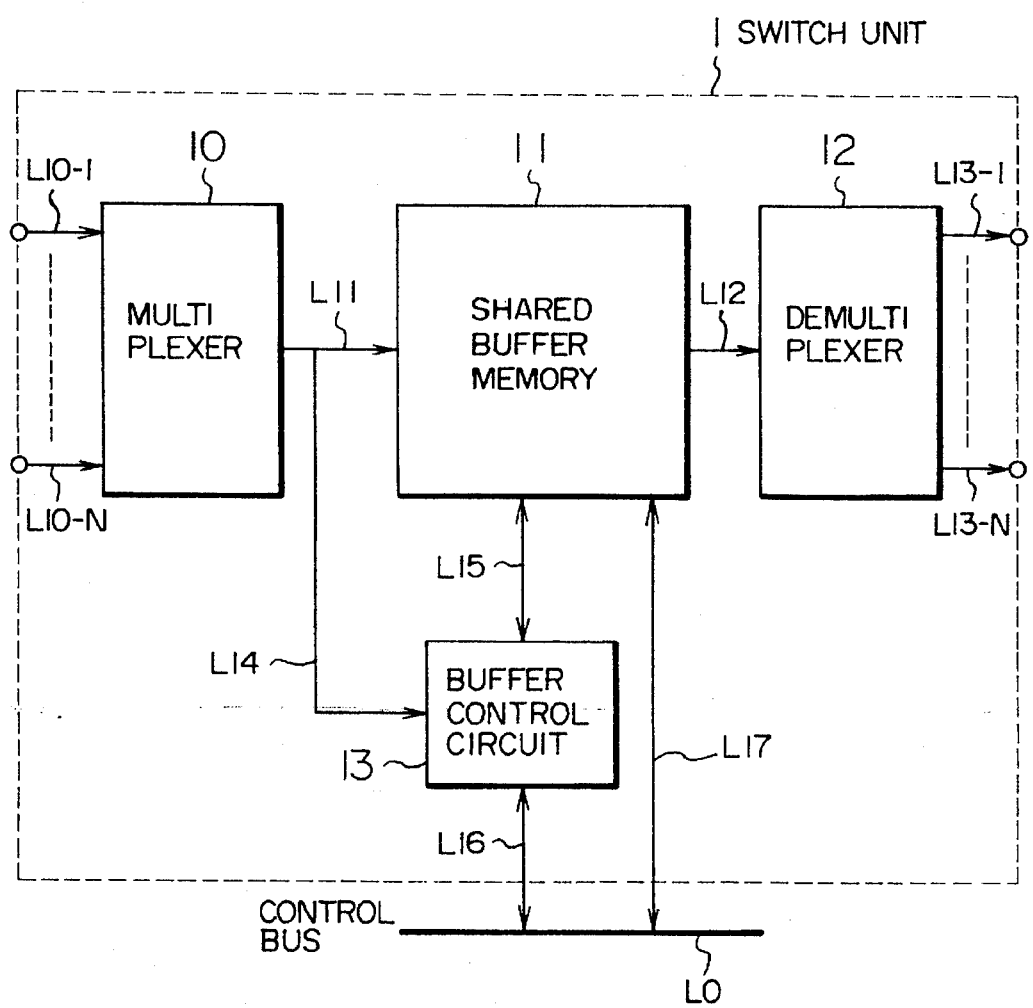
FIG. 2 is a diagram showing a switch unit 1 according to an embodiment.

FIG. 2 is a diagram showing an ATM switch applied as the above-mentioned switch units (1-11 to 1-3N) according to an embodiment.

A switch 1 includes a cell multiplexer 10 for multiplexing the cells input from the input lines L10 (L10-1 to L10-N), a shared buffer memory 11 for temporarily accumulating the cells sequentially supplied from the multiplexer 10, a cell demultiplexer 12 for selectively distributing the cells read from the shared buffer memory 11 to one of the output lines L13(L13-1 to L13-N), and a buffer controller 13.

The cells input from the input lines L10-1 to L10-N are multiplexed by the multiplexer 10 and output to the line L11. In the case where the input lines L10-1 to L10-N have a data transfer speed of 150 Mbps and the number N of lines is eight, the multiplexer 10 outputs cells one by one sequentially at the rate of 1.2 Gbps (8×150 Mbps) to the line L11.

Each cell output to the line L11 is stored in the shared buffer memory 11 in a form added in the order of arrival at one of the list structures corresponding to the output lines L13-1 to L13-N to which the particular cell is to be output under the R/W control of the buffer controller 13.

The cells stored in the shared buffer memory 11 are read out to the line L12, for example, in such a form as to access a plurality of the above-mentioned list structures periodically, and distributed by the demultiplexer 12 to one of the output lines L13-1 to L13-N corresponding to the list structure accessed.

The buffer controller 13 is supplied through the line L14 with the header information of the cells output from the multiplexer 10 to the line L11, and in accordance with the routing information (VC/VPI) contained in the header, generates a write address to the shared buffer memory 11. The buffer controller 13 also generates an address for selectively reading the cells to be output to the output lines in synchronism with the timing of output line selection and cell distribution to the output lines by the demultiplexer 12.

The control bus L0 is connected to the controller 3 shown in FIG. 1 on the one hand and through the lines L16 and L17 to the buffer controller 13 and the shared buffer memory 11 on the other hand.

The controller 3 is capable of controlling the operation of the buffer controller 13 externally at the time of function test by outputting a control instruction, data and an R/W address to the control bus L0. A test cell (cell pattern) can thus be written into or read from an arbitrary position in the shared buffer memory 11.

Also, an arbitrary cell can be output to the line L12 in accordance with a control instruction issued from the control bus L0 by the controller 3 in priority over the buffer control by the buffer controller 13.

Figure 3:
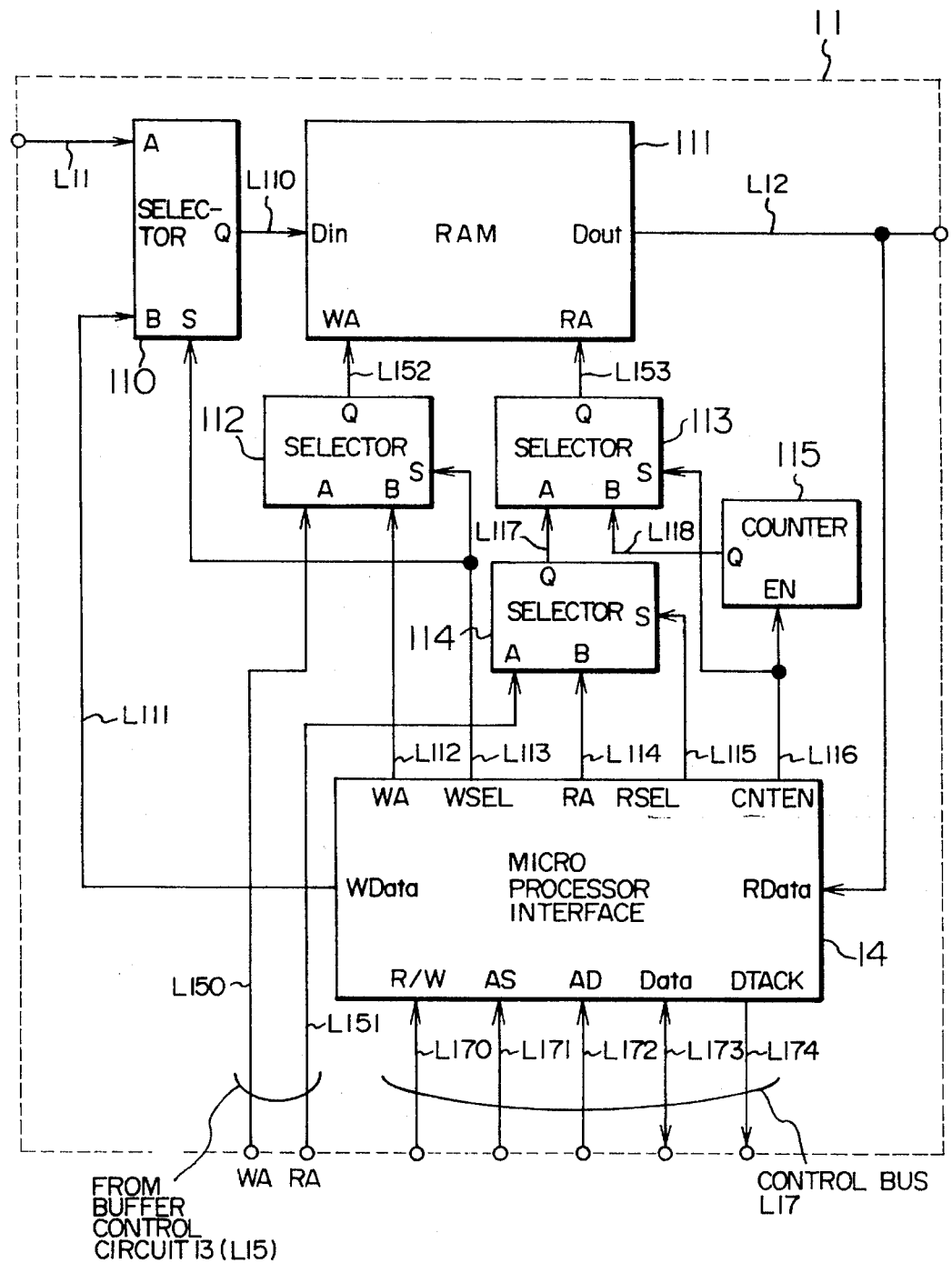
FIG. 3 is a diagram showing a shared buffer memory 11 of FIG. 2 according to an embodiment.

FIG. 3 shows a specific configuration of the shared buffer memory 11 of FIG. 2 according to an embodiment.

In FIG. 3, numeral 111 designates a RAM for storing cells. The write address WA and the read address RA of this RAM are supplied from selectors 112 and 113 adapted to operate respectively in accordance with instructions from a microprocessor interface 14 connected to the controller 3 through the control bus L17.

The selectors 112 and 113 select one of the two addresses input to input ports A and B, which addresses are output as a write address and a read address to the lines L152 and L153 respectively.

The input port A of the write address selector 112 is supplied with a write address generated by the buffer controller 13 through the line L15 (L150).

The port A of the read address selector 113 is connected with another selector 114, and is supplied with the read address generated by the buffer controller 13 through the line L15 (L151).

The input port B of the write address selector 112 is supplied with the address input output from the microprocessor interface 14 through the line Ll12, and the port B of the read address selector 114 with the read address RA generated by the microprocessor interface 14. Also, the input port B of the read address selector 113 is supplied with the output of the counter 115 controlled by the microprocessor interface 14 through the line L118.

The data input port Din of the RAM 111 is adapted to be supplied selectively with a cell (test cell) input from the line L11 to the port A of the selector 110, or an output (test cell) of the microprocessor interface input through the line L111 to the port B of the selector 110.

The operation of the selector 110 is controlled by the control signal of the microprocessor interface circuit 14 supplied from the line L113.

Under the normal operating condition for switching user cells, the selector 110 is ready to select the port A, and the cell input from the line L11 to the port A is input the Din of the RAM 111. In this case, both the write address selector 112 and the read address selector 113 are ready to select the input to the port A. Thus the write address and the read address output by the buffer controller 13 to the line L15 are input to the WA and RA of the RAM 111 respectively.

At the time of switch function test, the microprocessor interface 14 switches the selector status in response to an instruction from the controller 3. Specifically, the control signal WSEL output to the line L113 sets the selectors 110 and 112 in a mode to selector the input B. In the test cell write cycle, the data WData output from the microprocessor interface 14 to the line L111 is thus written into the RAM in accordance with the write address output to the line L112.

Also, the selector 114 is caused to select the input of the port B by the control signal RSEL output from the microprocessor interface 14 to the line L115 in a test cell read cycle. On the other hand, by causing selector 113 to select the input of the port A, the microprocessor interface 14 reads the cell from the read address RA output position to the line L114. This cell is fetched to the RData input of the microprocessor interface 14.

In the case where cells are continuously generated from the RAM 111 under the control of the microprocessor interface 14, a control signal CNTEN is output to the line L116 and the read addresses are continuously generated from the counter 115. Also, the selector 113 is caused to select the output of the counter 115, and the read address generated in the counter is applied to the RAM 111.

Figure 4:
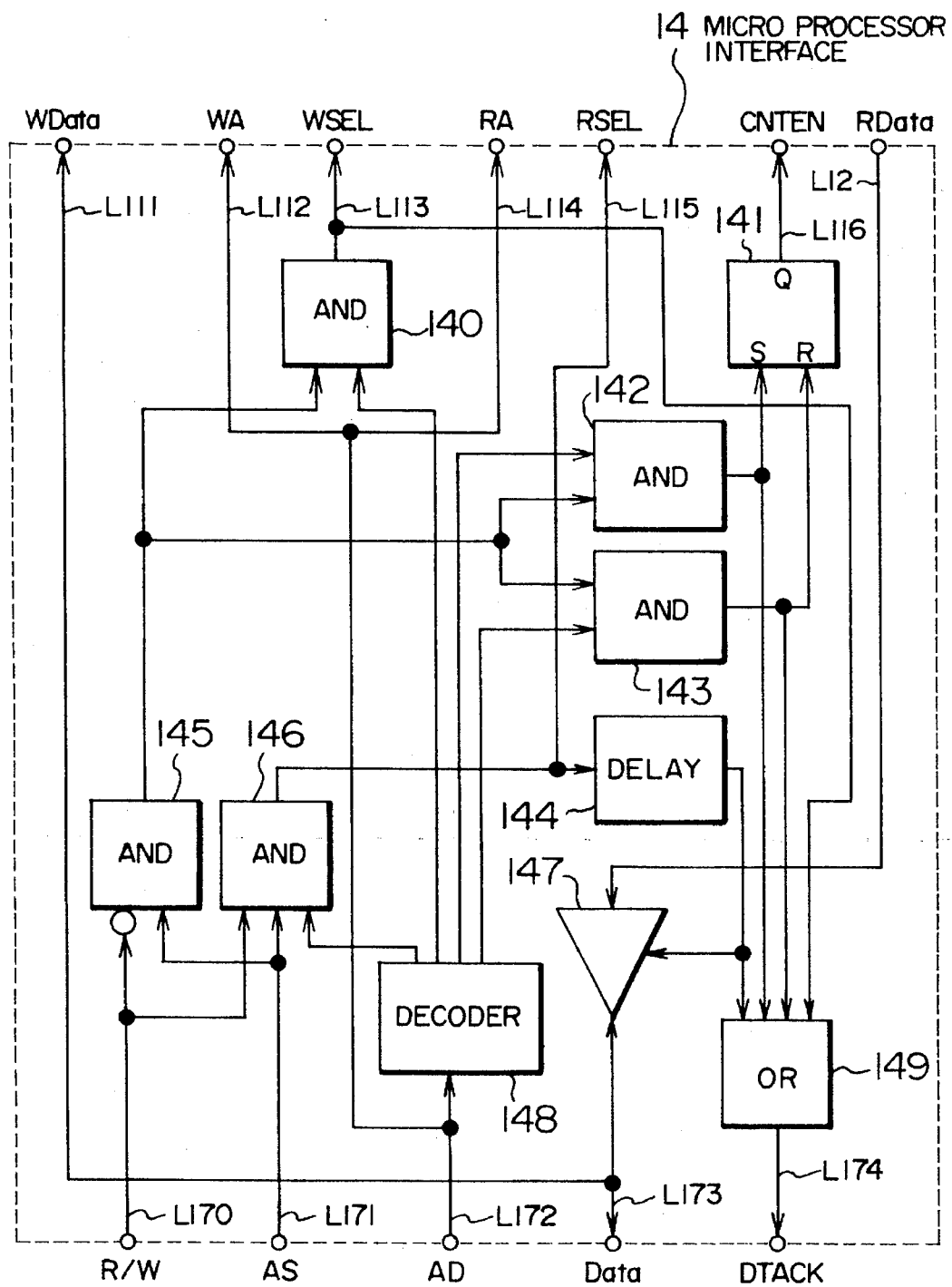
FIG. 4 is a diagram showing a microprocessor interface 14 of FIG. 3 according to an embodiment.

The configuration of the microprocessor interface 14 is shown in FIG. 4.

At the time of cell writing, the read/write signal R/W assumes "0", and the R/W control line L170 is set to write mode W. The write address and the cell data applied to the lines L172 and L173 are output to the lines L112 and L111 respectively.

The write address on the line L172 is input also to the decoder 148. At the time of cell writing, therefore, the control signal "1" is applied to the AND circuit 140 from the decoder L48.

In the process, the AND circuit 145 outputs a "1" signal by an address strobe signal AS applied to the line L171, and the AND circuit 140 outputs a "1" signal. As a result, the control signal WSEL is generated on the line L113, and the cell data on the line L111 is written into the RAM 111 (FIG. 3) in accordance with the write address of the line L112.

The control signal WSEL generated on the line L113 is output through an OR circuit 149 to the line L174 as a data attack DTACK signal.

In reading cells to the control bus, the read/write signal R/W applied to the line L170 is set to "1" (read mode), and the read address applied to the line L172 is output to the RA line L114. At the same time, the decoder 148 outputs the control signal "1" to the AND circuit 146. When an address strobe signal AS is generated on the line L171, therefore, the AND circuit 146 outputs a "1" signal. The control signal RSEL thus is generated on the line L115, and in accordance with the read address on the line L114, the cell data is read from the RAM 111 (FIG. 3).

The cell data Rdata read from the RAM 111 to the line L12 is input to the output buffer 147. In the process, the output buffer 147 is ready to output a signal by the control signal RSEL supplied thereto through a delay circuit 144. The cell data Rdata, therefore, is output from the output buffer memory 147 to the line L173.

The control signal RSEL output from the AND circuit 146 is input also to the OR circuit 149 through a delay circuit 144 and generates the data attack signal DTACK on the line L174.

In the case where cells are continuously read from the RAM 111 (FIG. 3), the read/write signal R/W on the line L170 is set to "0" (write mode), and a write address is set on the line L172 to produce a control output "1" from the decoder 148 to the AND circuit 142.

When an address strobe AS is applied to the line L171 under this condition, the AND circuit 145 and the AND circuit 142 output a "1" signal, and the set signal of an SR flip-flop 141 assumes a "1" state. As a result, a control signal CNTEN is generated on the output line L116 of the SR flip-flop 141, and cell data are continuously read from the RAM 111.

The output signal of the AND circuit 142 is input to the OR circuit 149. Also in this case, the data attack signal DTACK is generated on the line L174.

The termination of reading the cell data continuously from the RAH 111 (FIG. 3) sets the read/write signal R/W applied to the line L170 to "0" (write mode), and applies a write address to the line L172 in such a manner as to set the control output from a decoder 148 to an AND circuit 143 to "1".

Assuming that an address strobe signal AS is applied to the line L171 under this condition. The outputs of the AND circuit 145 and the AND circuit 143 assume a "1" state, and the reset signal of the SR flip-flop 141 also a "1" state. As a result, the control signal CNTEN ceases to be generated on the line L116, and the continuous cell generation from the RAM 111 ceases. At the same time, the output signal of the AND circuit 143 is input to the OR circuit 149, and the data attack signal DTACK is generated on the line L174.

Figure 5:
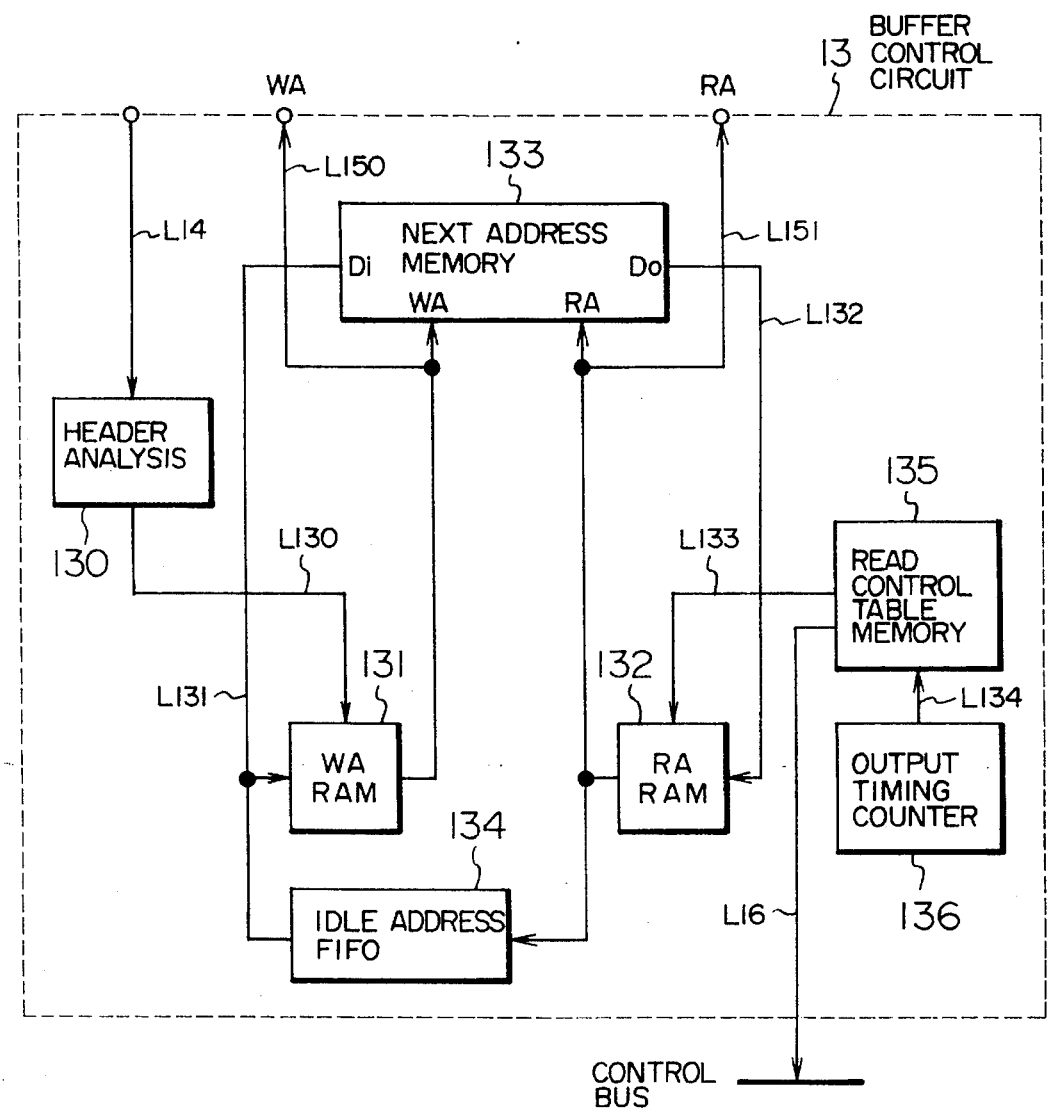
FIG.5 is a diagram showing a buffer controller 13 of FIG. 2 according to an embodiment.

FIG. 5 shows an example configuration of the buffer controller 13.

The header of the cell input from the line L14 is input a header analyzer 130, and a queue number corresponding to the output port of the switch from which a cell is to be output is extracted and output to the line L130.

This queue number is applied to a write address memory WARAM 131 as an address, and a write address (pointer address) stored previously in the address memory WARAM 131 in correspondence with the queue number is read out on the line L150.

Numeral 133 designates a next address memory having a plurality of address storage areas corresponding to a plurality of queues formed in the shared buffer memory (FIG. 2) for storing the write addresses (pointer addresses) of the next-arriving cells for each queue. Numeral 134 designates an idle (or empty) address FIFO for storing empty addresses providing an unused record area in the shared buffer memory.

In the cell write cycle, a write address (pointer address) previously stored is read from the storage position addressed by the queue number in the write address memory WARAM 131. At the same time, the idle address retrieved from the idle address FIFO 134 is written as a new write address (pointer address). Also, the idle address retrieved from the idle address FIFO 134 is applied to the next address memory 133 as a data input Di.

In the process, the next address memory 133 is supplied with the pointer address previously stored in the write address memory WARAM 131 as a write address WA. A cell is written also in the shared buffer memory (RAM 111) with the pointer address as a write address WA.

The operations are iterated of storing the pointer address in the address memory 131 and writing the cell and the pointer address in the buffer memory 111 and the next address memory 133 utilizing the storage operation. Each time of arrival of the cells having the same queue number, the pairs of the next cell and a pointer address are successively added to the memory position designated by the particular pointer address. A cell link structure thus continues to be formed for each queue number.

In the cycle of reading cells from the shared buffer memory 11, the queue number to be accessed is output from the read control table 135 is output in accordance with the timing signal output from the output timing counter 136 to the line L134. This queue number is applied through the line L133 to the read address memory RARAM 132 as an access address.

The read address memory RARAM 132 stores the pointer address previously read from the next address memory 133 in correspondence with the queue number. The pointer address corresponding to the queue number designated by the line L133 is output to the line L151 as a read address RA.

The read address RA is applied as a read address to the shared buffer memory (RAM 111) and the next address memory 13. As a result, a cell is read from the queue (link structure) corresponding to the queue number of the shared buffer memory 11. Concurrently, a new pointer address designating the next cell position in the same queue is read from the next address memory 133 to the line L132.

The new pointer address is input to the read address memory RARAM 132 as data, and is stored in a position corresponding to the queue number. Once the pointer address is updated, the previous pointer address RA output to the line L151 becomes useless, and therefore is stored as an unused address in the idle address FIFO 134.

Figure 6:
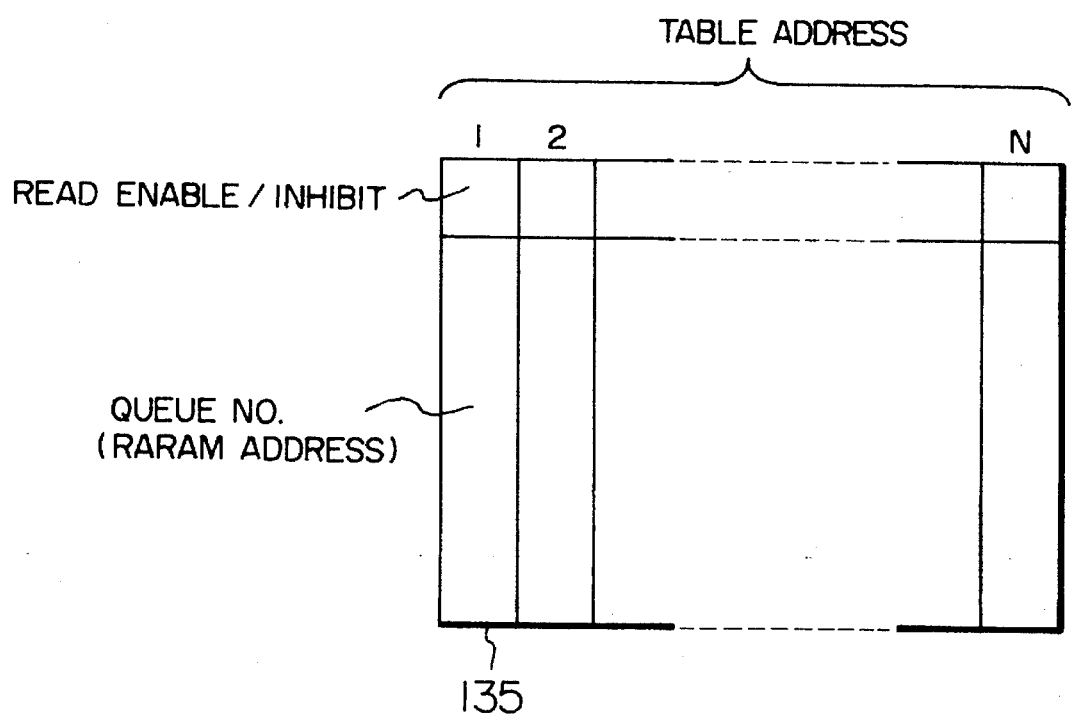
FIG. 6 is a diagram showing a read control table 135 of FIG. 5 according to an embodiment.

An example configuration of the read control table 135 is shown in FIG. 6.

The read control table 135 has as many table addresses as the number N of output ports of the switch 1. A record area including the read enable/inhibit information and the queue number information (corresponding to the RARAM address) is formed in each address. This table has the function as a bandwidth control table.

The read control table 135 is accessed with an output port number generated in circulation from the output timing counter 136 of FIG. 5 as an address. In this way, the read enable/inhibit information and the queue number information of the queue corresponding to the output port number are read out.

In the case where the read enable/inhibit information indicates "inhibit", the cell read operation from the shared buffer memory 11 is suppressed. The use of this function suppresses the cell read operation from the shared buffer memory 11 and thus can retain the cell in the shared buffer memory 11 at a cell output timing with respect to a specific output port.

Consequently, after a cell output from a switch unit is input to another switch unit to be checked, the particular cell can be stored in the shared buffer memory. The cell in the shared buffer memory can be read by the control bus L0, and checked whether it is rightly received by the switch unit.

The information in each record area of the read control table 135 can be set from the controller 3 through the control bus L0.

In a modification of the read control table 135, the same queue number is set in two records of different table addresses. The cells read from the same queue can thus be output in alternate distribution to the two output ports of the switch, so that cells can be transferred to the output at a rate twice that for other queues.

In this case, the cells read out from the same queue are alternately distributed between adjacent two output ports, which are connected to one line through a multiplexer. Then, the cell output to a line having the transmission rate twice that of the other lines is made possible.

The read control table 135 includes first to fourth records (four times that of the output ports). These records are divided into four groups of N records, so that the output timing counter performs the counting operation from 1 to 4N. The queue number 1 is see in the jth record in the first group, and other queue numbers in the jth record of the second to fourth groups of the read control table. In this way, the cells of the queue number 1 are read to the output port 1 at the rate of once every four output cycles. It is thus possible to provide an output bandwidth one fourth for a queue having the same queue number in all the kth records of the first to fourth groups.

As described above, the read control table 135 is capable of controlling the rate at which cells are read from each queue and controlling the bandwidth for each queue depending on the setting of the contents thereof.

Figure 7:
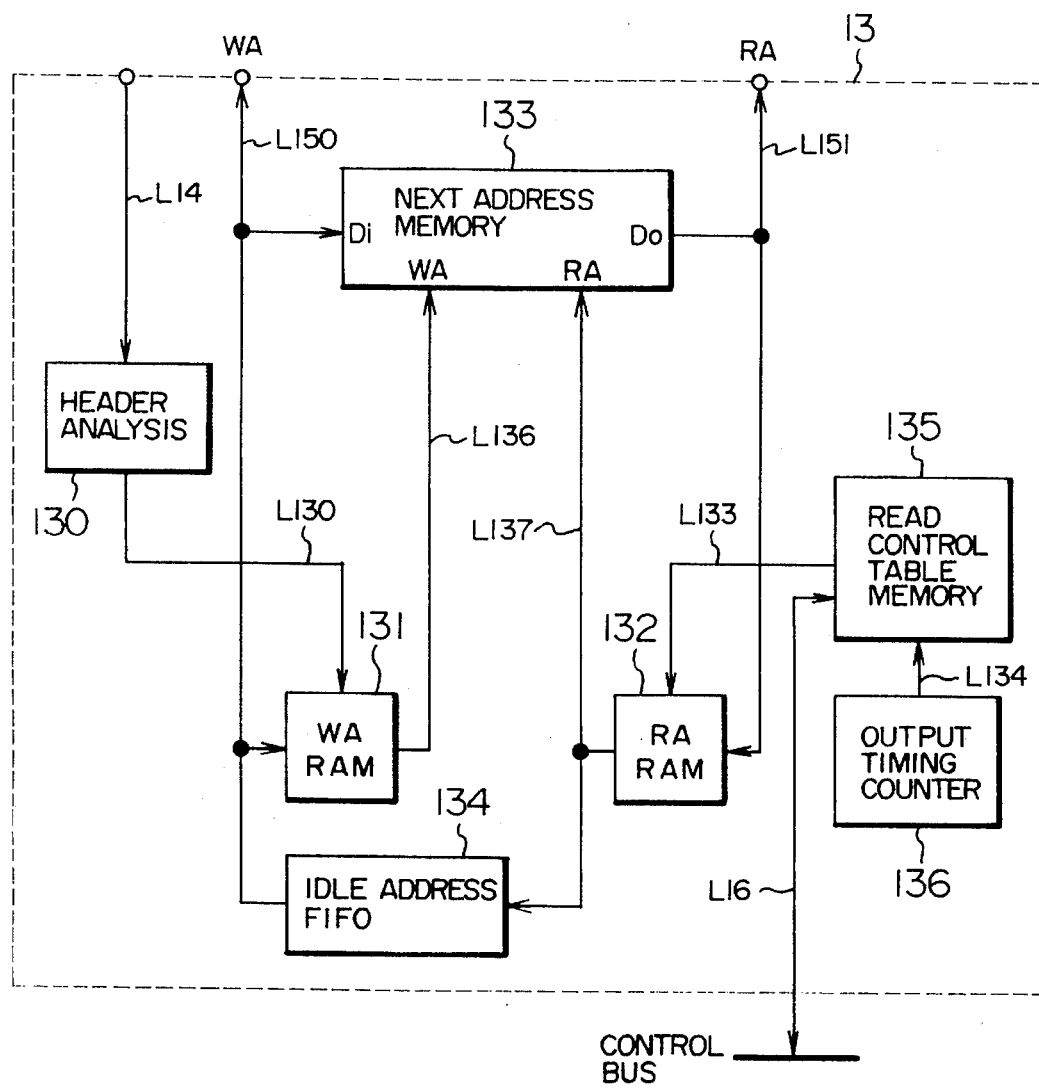
FIG. 7 is a diagram showing a buffer controller 13 of FIG. 2 according a second embodiment.

The buffer controller 13 according to a second embodiment is shown in FIG. 7.

In the embodiment shown in FIG. 5, the write address WA is output from the write address memory WARAM 131, and the read address RA from the read address memory RARAM 132. According to the embodiment under consideration, in contrast, the write address WA is output from an idle address FIFO 134, and the read address RA from a next address memory 133, each being applied to a shared buffer memory 11.

In this case, the write address memory WARAM 131 has stored therein a pointer address indicating the position of the leading cell in the same queue, and the read address memory RARAM 132 an address indicating the storage position of the read address for the shared buffer memory on the next address memory 133.

According to this embodiment, the unused address obtained from the idle address FIFO 134 can be utilized directly as an address for writing a cell to the shared buffer memory before analysis of the cell header at the header analyzer 130 or reading a pointer address from the write address memory WARAM 131. The advantage is therefore that the timing conditions can be relaxed.

Figure 8:
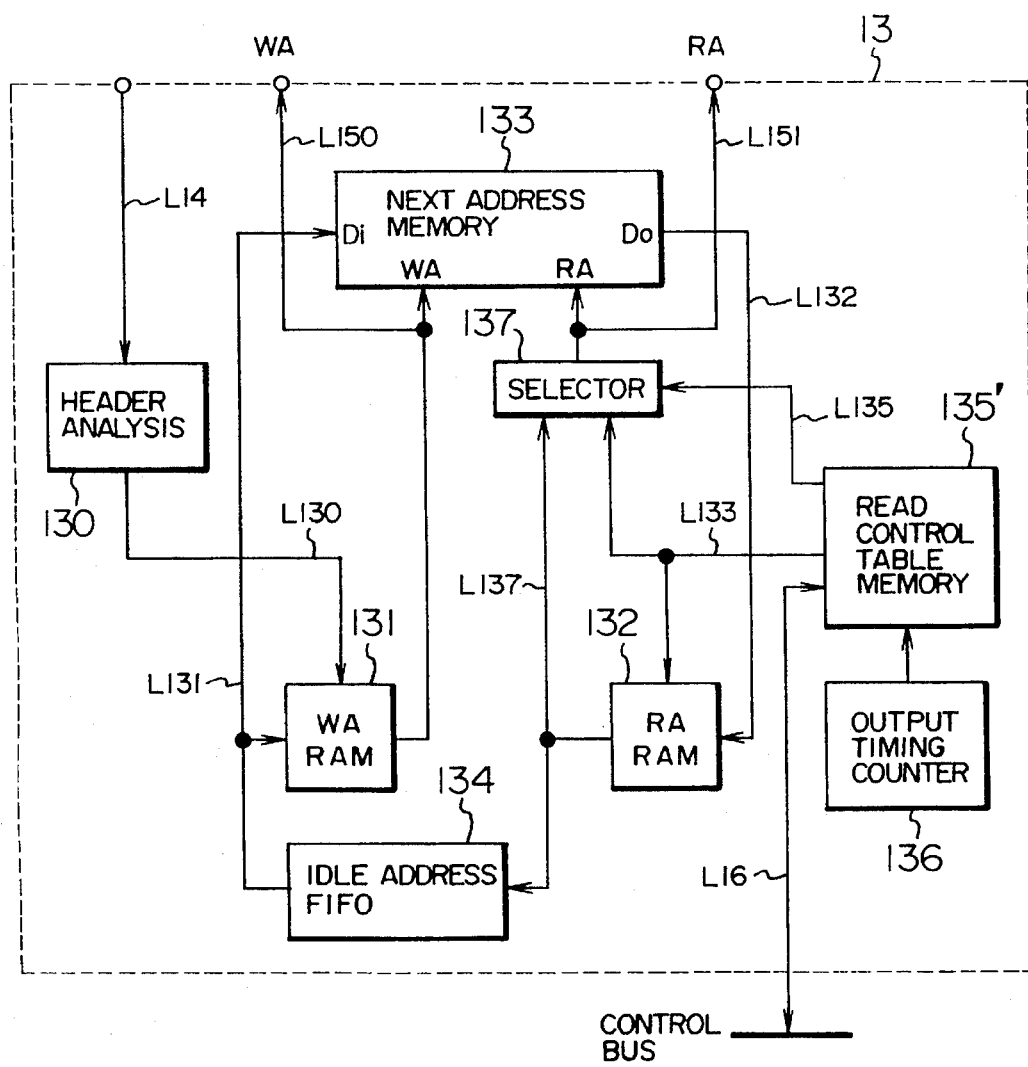
FIG. 8 is a diagram showing a buffer controller 13 of FIG. 2 according to a third embodiment.

The buffer controller 13 according to a third embodiment is shown in FIG. 8.

In this embodiment, cells can be generated continuously without using the counter 115 shown in FIG. 3, and thus the continuous cell generation can be realized only for a specific output port selectively.

According to the third embodiment, a selector 137 is inserted between the next address memory 133 and the read memory 132 in the circuit configuration of FIG. 5, which selector 137 is controlled by a read control table 135'.

Figure 9:
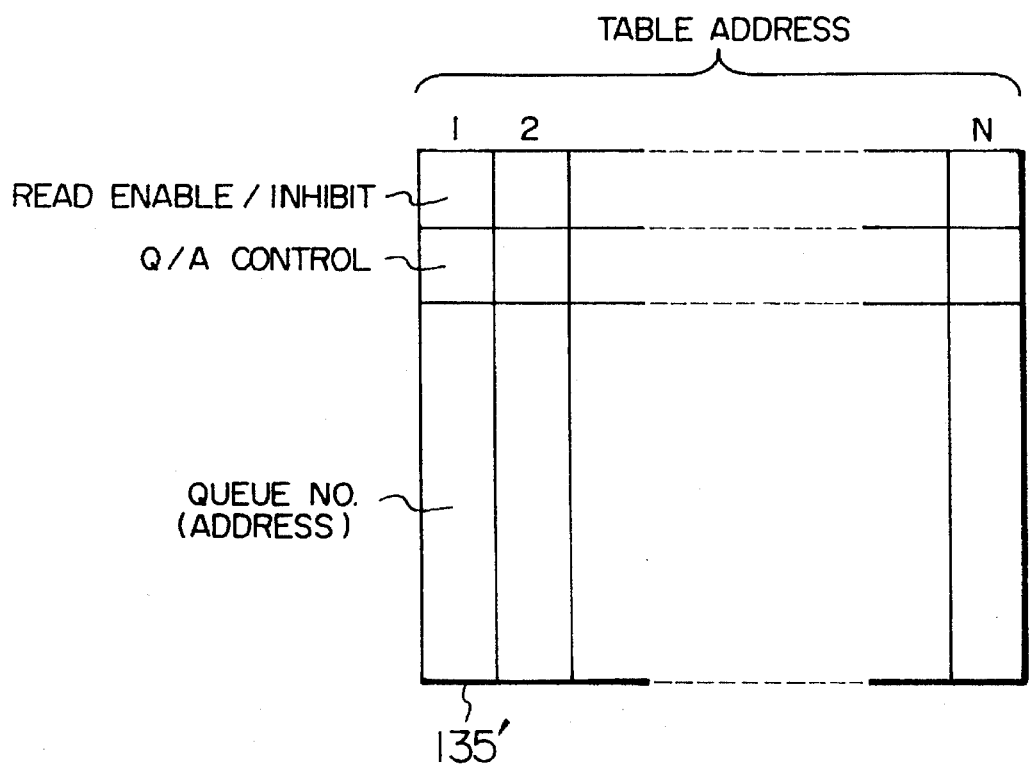
FIG. 9 is a diagram showing a read control table 135' of FIG. 8 according to a third embodiment.

In this case, each record in the read control table 135', as shown in FIG. 9, is modified to include a read enable/inhibit information field, a Q/A control information field and a queue number/address setting field.

In the case where a "1" is set as the Q/A control information, the content in the queue number/address setting field is handled as a queue number. According to this queue number, the read address memory RARAM 132 is accessed. The address read out from the RARAM 132 is applied to the shared buffer 11 (FIG. 2) as a read address through the line L137, the selector 137 and the line L151.

More specifically, when a "1" is set in the Q/A control field, the normal operation is performed as in the first embodiment.

In the case where a "0" is set in the Q/A control field, on the other hand, the content of the queue number/address setting field is handled as a read address.

In this case, the read address output from the read control table 135' to the line L133 is applied through the selector 137 and the line L151 to the shared buffer 11 (FIG. 2) as a read address.

The test cell data (cell pattern) is written in the memory area at a specified address on the shared buffer 11 through the control bus L0 from the controller 3. A "0" is set in the Q/A control information field of the record corresponding to a specified output port in the read control table 135', and this specific address is set in the queue number/address setting field. Then, a test cell pattern can always be output to the output port in the read cycle.

Assuming that the specific address for writing cells from the control bus L0 is not used in the write address memory WARAM 131, the read address memory RARAM 132, the next address memory 133 or the idle address FIFO 134. The cells input from the normal switch input lines L10-1 to L10-N can be output to the output ports having a "1" in the Q/A control information field of the bandwidth control table 135'.

In other words, a specific test cell pattern can be output only from a specific output port and normal user cells from other output ports.

Figure 10:
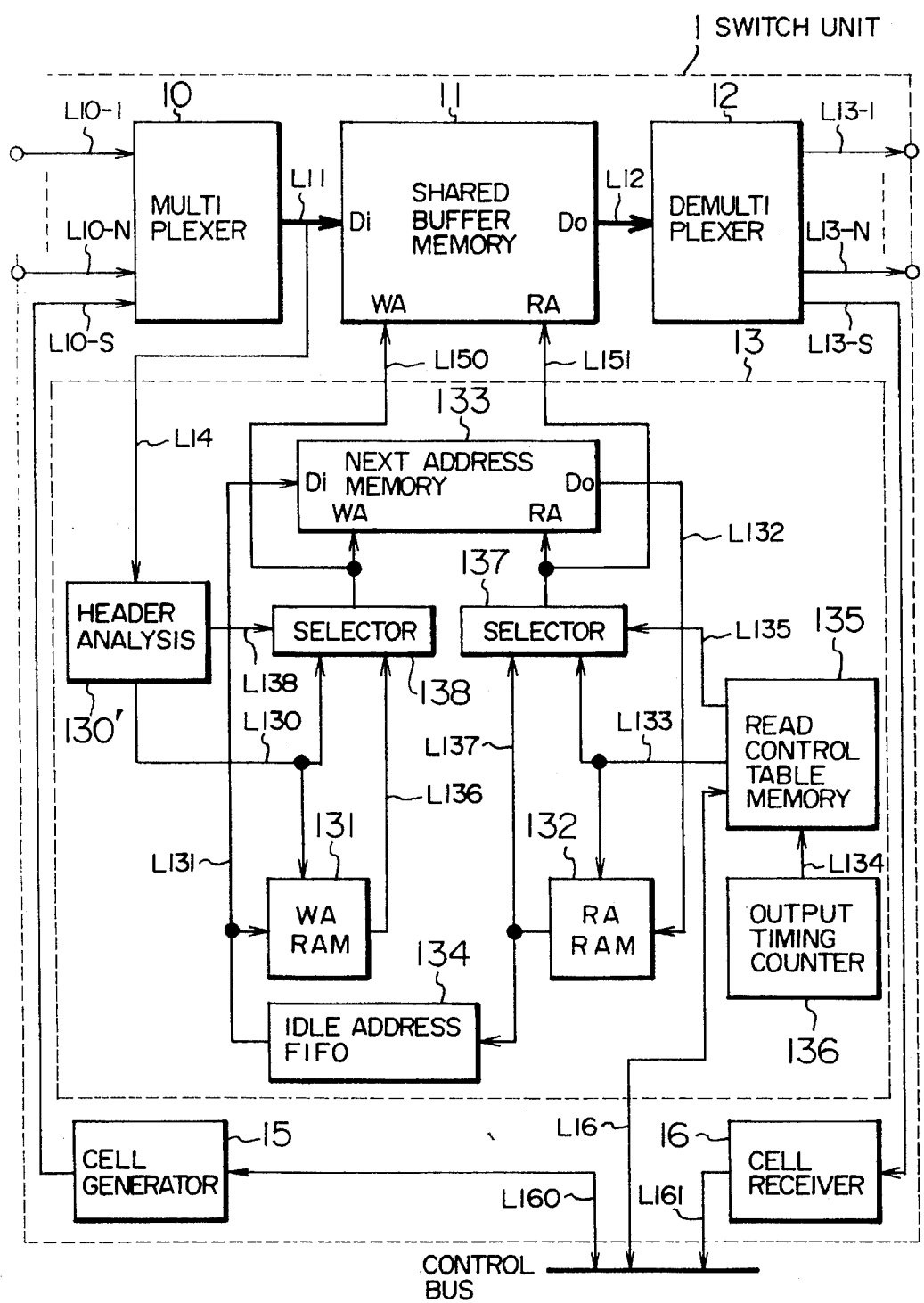
FIG. 10 is a diagram showing a switch unit according to another embodiment.

The ATM switch according to another embodiment is shown in FIG. 10.

According to this embodiment, a shared buffer memory 11 is not accessed directly through the control bus L0, but the cell data can be written into or read from the address position designated in the shared buffer memory thereby to reduce the burden of adding circuit elements in the shared buffer memory 11 requiring a high-speed operation.

This embodiment is so configured that a cell generator 15 and a cell receiving circuit 16 are added to the circuits shown in FIG. 2, and a selector 138 to the buffer controller 13 shown in FIG. 8.

A test cell pattern is written into the cell generator 15 from the controller 3 through the control bus L0 thereby to generate the same cell pattern on the line L10-S.

Figure 11:
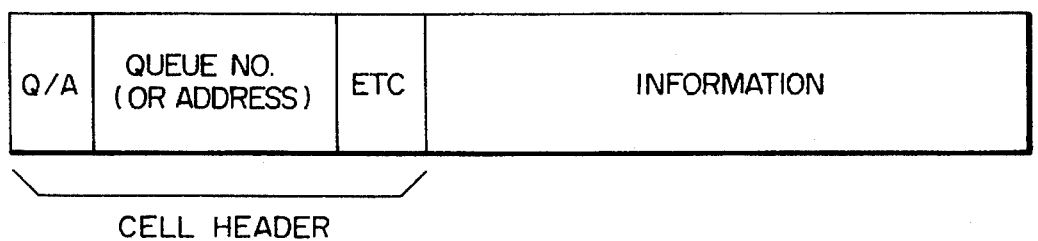
FIG. 11 is a diagram showing the format of a cell input to the switch unit of FIG. 10.

In this case, the cell format input to the switch has, for example, a cell header containing a Q/A field and a queue/address setting field as shown in FIG. 11. When the Q/A field is "1", the content of the queue number/address field is handled as a queue number. In the case where the Q/A field is "0", on the other hand, the content of the queue number/address field is considered an address.

In the ATM switch shown in FIG. 10, the cells input from the input lines L10-1 to L10-N have the Q/A field thereof set to "1" and the cell header thereof containing a queue number. The cells input through the output lines L10-S from the cell generator 15, on the other hand, have the Q/A field thereof set to "0" with the cell header having an address.

In the case where the header of the input cell has a "1" in the Q/A field thereof, the header analysis circuit 130' causes the selector 138 to select an address from the line L136. When the header of the input cell has a "0" in the Q/A field thereof, on the other hand, the selector 138 is caused to select an address from the line L130.

The header analysis circuit 130' outputs the queue number or address extracted from the header of the input cell to the line L130.

As a result, in the case where a test cell having a "0" in the Q/A field thereof is input from the cell generator 15 to the switch, the address output to the line L130 is applied as a write address to the shared buffer memory 11 through the selector 138.

More specifically, the test cell generated from the cell generator 15 is written in a specific memory location in the shared buffer memory 11 with the address set in the cell as a write address.

With regard to the user cells input from the input lines L10-1 to L10-N, on the other hand, which have the cell header thereof containing a Q/A field of "1", the write address (pointer address) of a corresponding queue is read from the write address memory WARAM 131 in accordance with the queue number output to the line L130. The operation of writing a cell into the shared buffer memory 11 is executed using this address as a write address.

According to this embodiment, a test cell pattern can be written into a specific address in the shared buffer memory 11. This cell can be output repeatedly to a specific output port by the bandwidth control table 135' as explained with reference to FIGS. 8 and 9.

The test cell written into the switch 1 can be collected at the cell receiving circuit 16 connected to a specific output line L13-S if the queue number of the cell header thereof is matched with the output line L13-S.

Also, the cell input to the cell receiving circuit 16 is read to the controller 3 from the control bus L0 to confirm the reception of a cell having a specific queue number at the switch 1.

The cell format shown in FIG. 11 permits the cell to be written in a specific address of the shared buffer memory 11 by setting a "0" in the Q/A field thereof. The cell in the specific address area can be output to a plurality of output ports by the read control table 135'. A multicast operation of the same cell can thus be realized utilizing these functions. This is effectively applied to video distribution or other distribution of information having a large bandwidth.

Figure 12:
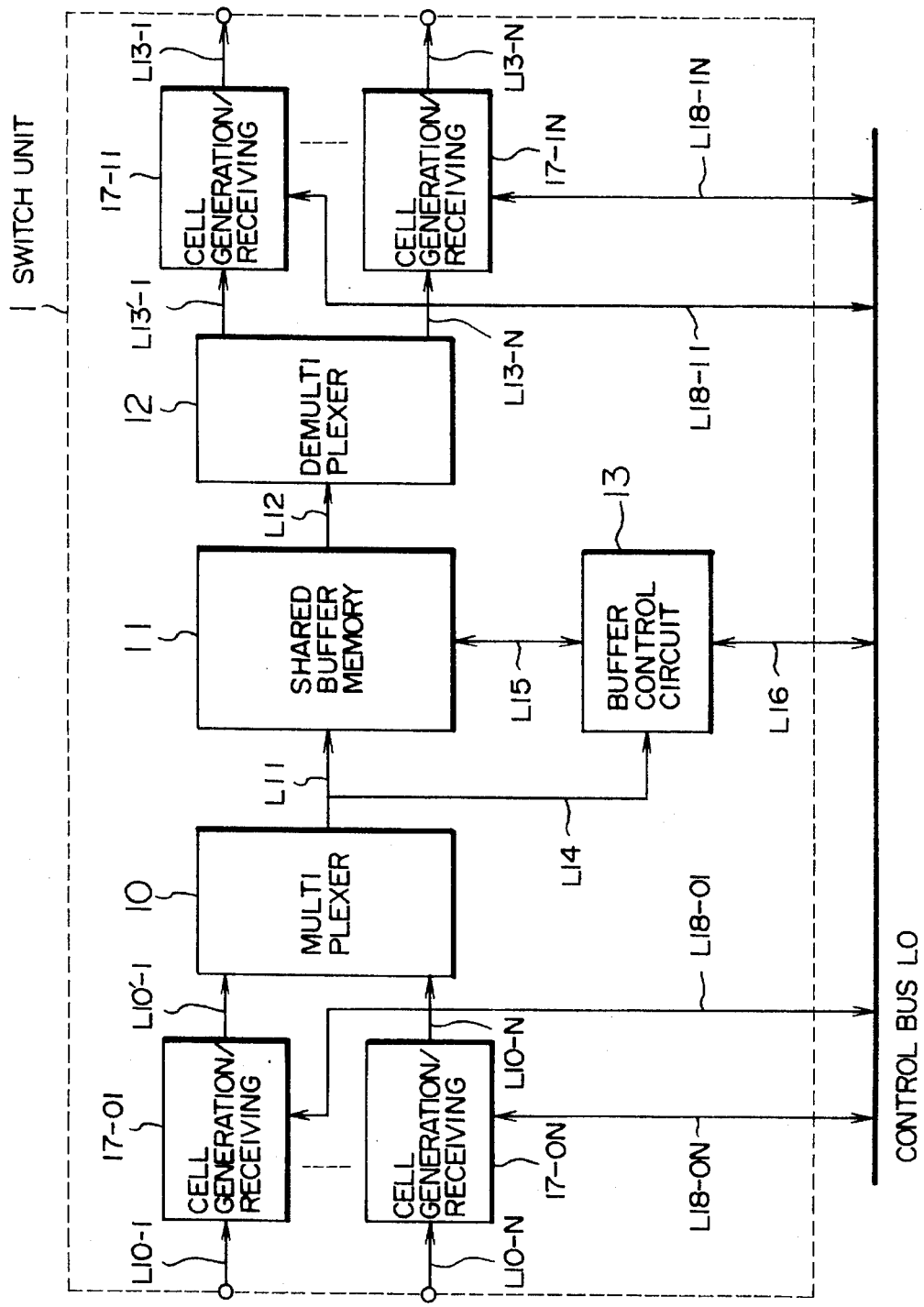
FIG. 12 is a diagram showing a switch unit according to another embodiment.

The ATM switch according to another embodiment is shown in FIG. 12.

According to this embodiment, the switch 1 shown in FIG. 2 additionally includes cell generation/receiving circuits 17-0$i$ (i=1 to N) and 17-1$i$ (i=1 to N) corresponding to lines on the input side of the multiplexer 10 and the output side of the demultiplexer 12 in correspondence with each other. In this way, the cell output and cell reception at the switch can be confirmed using the function of the cell generation/receiving circuits 17-01 to 17-1N without accessing the shared buffer memory 11 through the control bus L0.

The cell generation/receiving circuit 17-0i outputs the input cell from the line L10-i directly to the line L10'-i in the absence of an instruction from the control bus L0. A test cell pattern is set in the cell generation/receiving circuit 17-0i beforehand through the control bus L0. Upon receipt of an instruction for continuous cell output from the control bus L0, the cell generation/receiving circuit 17-0i continuously outputs the cell pattern set as above, while upon receipt of a read instruction from the control bus L0, the received cell is output to the control bus L0.

In the switch shown in FIG. 12, cells are generated from one of the cell generation/receiving circuits 17-01 to 17-0N and received by one of the cell generation/receiving circuits 17-11 to 17-1N, so that the robustness of the switching function can be inspected between the respective input and output ports in the switch.

Also, a cell is generated from the cell generation/receiving circuit 17-1i (i=1 to N) on the output side of one of two switch units, and is received by the cell generation/receiving circuit 17-0j (j=1 to N) on the receiving side of the other switch unit. In this way, the robustness of the cell transfer function between the switch units can be tested.

In other words, this switch structure is capable of inspecting the internal functions of switch units and the cell transfer function between switch units independently of each other.

This type of switch, due to the presence of a phase difference between the clock system of an input cell and that in the switch, generally requires a buffer memory for absorbing the phase difference on each input line. In the switch structure shown in FIG. 52, however, the buffer memory used for cell pattern storage of the cell generation/receiving circuits 17-01 to 17-0N can be used also for absorbing the phase difference. An example configuration of the cell generation/receiving circuit to suit such a purpose is shown in FIG. 13.

Figure 13:
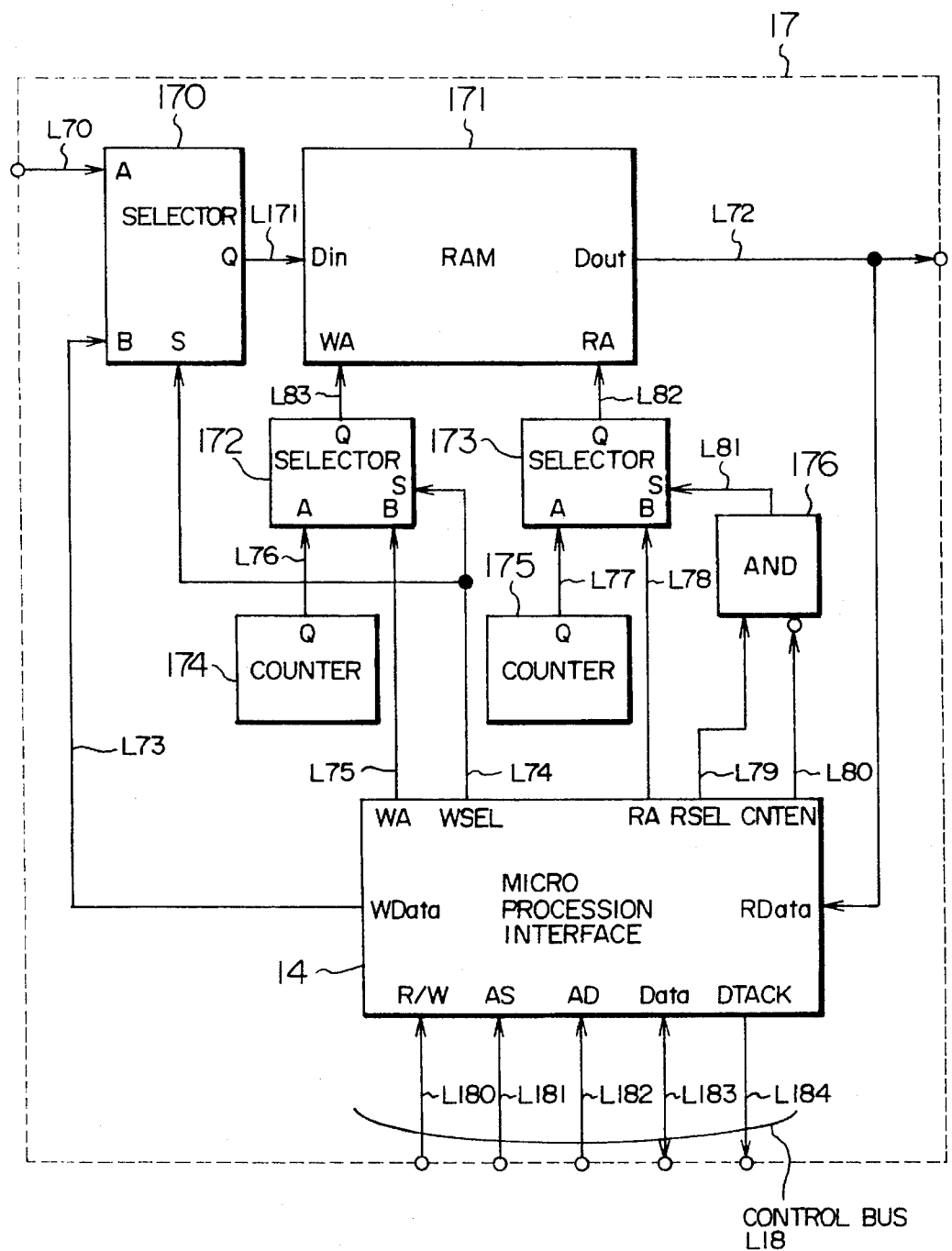
FIG. 13 is a diagram showing a cell generator/receiving circuit 17 of FIG. 12 according to an embodiment.

In FIG. 13, during the normal operation without any special instruction issued from the control bus L18, an input selector 170 selects an input cell from the line L70 and the cell input from the line L70 is written in a RAM 171.

Numeral 174 designates a receiving counter adapted to operate in synchronism with the clock of the received cell. The output of the receiving counter 174 is applied as a write address to the RAM 171 through the selector 172.

Numeral 175 designates a transmission counter adapted to operate in synchronism with the clock in the switch. The output of this transmission counter 175 is applied as a read address to the RAM 171 through a selector 173. The cell read from the RAM 171 is output to the line L72. In this case, the input cell is written into the RAM 171 by the received clock, and the cell is output from the RAM 171 by the clock internal to the switch. The phase difference of the input cell between the clock in the receiving system and that in the switch can thus be absorbed.

The microprocessor interface 14 has a configuration similar to that shown in FIG. 4, and performs the operation similar to that of the microprocessor interface 14.

In the case of writing a test cell pattern into the RAM 171 through the control bus, the microprocessor interface 14 is caused to output a control signal WSEL, so that the selectors 170 and 172 are caused to select a B input, and the write address WA output by the microprocessor interface 14 is applied through the selector 172 to the RAM 171. As a result, the cell pattern generated from Wdata is written into the RAM 171 through the selector 170.

In outputting the cell pattern continuously from the RAM 171, on the other hand, the microprocessor interface 14 is caused to generate a control signal CNTEN, which is applied through an AND circuit 176 to the selector 173, which in turn is caused to select the output of a transmission counter 175. Consequently, the read address output from the transmission counter 175 is applied to the RAM 171, and cells are read out continuously from the RAM 171.

In the case where the cells stored in the RAM 171 are read out to the control bus, the microprocessor interface 14 is caused to generate a control signal RSEL, which is applied to the selector 173 through the AND circuit 176 for the selector 173 to select the B input. Also, the read address RA is applied through the selector 173 to the RAM 171. The cell read from the RAM 171 is retrieved by the RData of the microprocessor interface 14 and transferred to the control bus.

It will thus be understood from the foregoing description that according to the present invention an arbitrary cell pattern is written in an arbitrary address of a buffer memory in each switch unit and read out to a control unit. In this way, whether the switching operation is required or not can be checked. This invention is applicable especially suitably to inspection of an exchanger comprising switch units in multiple stages.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:
1. A switching system comprising:
   switching means including a plurality of input ports and output ports for selectively transferring input packets received from said input ports to one of said output ports specified in accordance with header information of the input packets;
   a plurality of line interface circuits each connected with a pair of an input line and an output line for transferring fixed length input packets each having a header field ahead of an information field received from the input line to one of the input ports of the switching means after rewriting the header information in the header field of the input packet and for transferring output packets derived from one of the output ports of the switching means to the output line connected therewith; and
   call control means for performing a call control for the packet communication carried out through the switching means and for supplying control information to the switching means and the line interface circuits;
   wherein said switching means includes:
   buffer memory means for storing a plurality of packets temporarily,
   buffer control means for writing input packets received from the input ports into the buffer memory means and for selectively reading out the packets from the buffer memory means to deliver the read out packets to one of the output ports specified by the header information of the packet, respectively, and testing means for writing a test packet at a specific address of the buffer memory means in accordance with a first instruction from said call control means and for reading out the test packet from the buffer memory means in accordance with a second instruction from the call control means.

2. A switching system according to claim 1, wherein said call control means is connected to said switching means through a control bus and said testing means includes means for delivering the test packet read out from the buffer memory means to the control bus so as to transfer the test packet to said call control means.

3. A switching system according to claim 2, wherein said testing means includes means for reading out a plurality of test packets continuously from the buffer memory means in accordance with an instruction from said call control means.

4. A switching system according to claim 2, wherein said switching means includes a multiplexer for multiplexing the input packets received from the input ports to sequentially supply the input packets to said buffer memory means and a demultiplexer for selectively distributing the packets read out from the buffer memory means to said output ports, said buffer control means having means for generating a pair of a write address and a pointer address for each input packet according to the contents of the header information of the input packet output from said multiplexer so as to store the input packets in the buffer memory means to form a plurality of logical queues corresponding to the output ports with said pointer addresses.

5. A switching system according to claim 1, wherein said testing means includes means for reading out a plurality of test packets continuously from the buffer memory means in accordance with an instruction from said call control means.

6. A switching system according to claim 5, wherein said switching means includes a multiplexer for multiplexing the input packets received from the input ports to sequentially supply the input packets to said buffer memory means and a demultiplexer for selectively distributing the packets read out from the buffer memory means to said output ports, said buffer control means having means for generating a pair of a write address and a pointer address for each input packet according to the contents of the header information of the input packet output from said multiplexer so as to store the input packets in the buffer memory means to form a plurality of logical queues corresponding to the output ports with said pointer addresses.

7. A switching system according to claim 1, wherein said switching means includes a multiplexer for multiplexing the input packets received from the input ports to sequentially supply said input packets to said buffer memory means and a demultiplexer for selectively distributing the packets read out from the buffer memory means to said output ports, said buffer control means having means for generating a pair of a write address and a pointer address for each input packet according to the contents of the header information of the input packet output from said multiplexer so as to store the input packets in the buffer memory means to form a plurality of logical queues corresponding to the output ports with said pointer addresses.

8. A switching system comprising switching means for selectively transferring fixed length packets received from a plurality of input line to one of a plurality of output lines specified in accordance with the header information in the header of the respective input packets, and a call control unit for performing call control for packet communication carried out through the switching means, said switching means including a plurality of switch units connected in multiple stages;

each of said switching units comprising a plurality of input ports, a plurality of output ports, a multiplexer for multiplexing packets received from said input ports to output the packets sequentially, a buffer memory for storing the packets derived from said multiplexer, a demultiplexer for selectively distributing the packets read out from the buffer memory to the output ports, and buffer control means for accessing the buffer memory;

said buffer control means including write access means for deciding a queue number by analyzing the header information of the packet derived from said multiplexer and generating a write address to store the packet in one of a plurality of logical queues specified by the queue number in said buffer memory, read access means for generating a read address to read a packet from a designated queue, and read control means for directly supplying a read address to said buffer memory at a read timing corresponding to at least one of said output ports designated by the call control means and for providing said read access means with a queue number to cause said read access means to read out a packet from one of said logical queues specified by the queue number at each read timing corresponding to the other of said output ports.

9. A switching system according to claim 8, wherein each of said switch units includes means for writing a test packet at a designated address location of the buffer memory in response to an instruction from said call control unit, said test packet being read out by directly supplying a read address from said read control means to said buffer memory.

10. A switching system according to claim 8, wherein:

a header of each packet has a first field for setting therein either a queue number or and address and a second field for setting therein identification information; and each of said switching units includes means for selecting a write address in accordance with the identification information of the input packet whereby the input packet is written into the buffer memory based on the write address generated from said write access means in the case where the identification information indicates that the first field includes a queue number and the packet is written into the buffer memory based on the address designated by the packet when the identification information indicates that the first field includes an address.

11. A switching system according to claim 10, wherein each of said switch units includes means for generating a test packet and supplying the test packet to said multiplexer in response to an instruction from said call control unit, said test packet including a write address in the first field and identification information in the second field which indicates that the contents of the first field is an address.

12. A function test method in an asynchronous transfer mode (ATM) switching system comprising a switch including a plurality of pairs of input and output ports, a plurality of line interface circuits each of which is connected to a pair of input and output lines for transferring ATM cells received from the input line to one of the input ports of said switch and transferring ATM cells received from one of the output ports of the switch to the output line, and call control means connected to the switch and the line interface circuits for controlling communications performed through the switch, said switch including buffer memory means for temporarily storing a plurality of input ATM cells and buffer control means for writing the input ATM cells received from the input ports in the buffer memory means so as to link each ATM cell to one of a plurality of logical queues selected in accordance with the header information of the input ATM cell and for reading out the ATM cells from the buffer memory means to deliver the ATM cells to the output ports, said function test method comprising the steps of:

supplying a test cell, a specific write address and a first control signal from said call control means to said buffer memory means;

writing the test cell into the specific address of said buffer memory means by selecting the test cell and specific address instead of the input ATM cell from one of the input ports and a write address from the buffer control means, in response to the first control signal from said call control means;

supplying a read address and a second control signal from the call control means to said buffer memory means; and reading out the test cell from said buffer memory by selecting that read address instead of the read address from the buffer control means, in response to the second control signal from said call control means.

13. A function test method according to claim 12, further comprising the step of:

transferring the test cell read from a designated address of said buffer memory to said call control means in response to the second control signal from said control means.

14. A switching system comprising:

switching means for selectively transferring fixed length input packets received from input terminals to one of output terminals specified in accordance with header information of each input packet, respectively;

a plurality of line interface circuits each connected with a pair of an input and output lines for transferring fixed length input packets having a header field ahead of an information field received from the input line to one of the input terminals of the switch means after rewriting the header information in the header field of each input packet and for transferring output packets derived from one of the output terminals of the switching means to the output line connected therewith; and call control means for performing a call control for a packet communication carried out through the switching means and for communicating control information with the switching means and the line interface circuits;

wherein said switching means constructed by a plurality of switching units connected in multiple stages and each of the switching units comprises:

a plurality of pairs of input and output ports;

buffer memory means for storing a plurality of packets temporarily, buffer control means for writing input packets received from the input ports into the buffer memory means and for selectively reading out each packet from the buffer memory means to one of the output ports specified by the header information of the packet, and testing means connected to said call control means for accessing said buffer memory means instead of said buffer control means to read out a packet from the buffer memory means in response to a control signal issued by the call control means.

15. A switching system according to claim 14, wherein said testing means includes means for transferring the packet read out from the buffer memory means to said call control means through a control bus connecting the testing means with the call control means.

16. A switching system according to claim 15, wherein said testing means includes means for writing a test packet supplied from said call control means through said control bus into said buffer memory means in response to a control signal issued by the call control means.

17. A switching system according to claim 14, wherein said testing means includes means for reading out a plurality of packets continuously from the buffer memory means in response to a control signal issued from said call control means.

18. A switching system according to claim 14, wherein each of said switching units includes a multiplexer for multiplexing the input packets received from the input ports to sequentially supply to said buffer memory means and a demultiplexer for selectively distributing the packets read out from the buffer memory means to said output ports;

said buffer control means includes first means for generating a pair of a write address and a pointer address for each input packet according to the contents of the header information of the input packet output from said multiplexer thereby to store the input packets in the buffer memory means so as to form a plurality of logical queues, second means for generating a read address of each of said logical queues, and third means for designating said second means a logical queue from which a packet is to be read out to one of said output ports; and said call control means controls said third means so as to suppress the designation operation of the logical queue so that a packet read out by said testing means is delivered to one of said output ports.

19. A switching system comprising:

switching means for selectively transferring fixed length input packets received from input terminals to one of output terminals specified in accordance with header information included in each input packet, respectively;

a plurality of line interface circuits each connected with a pair of input and output lines for transferring fixed length input packets having a header field ahead of an information field received from the input line to one of the input terminals of the switching means after rewriting the header information in the header field of each input packet and for transferring output packets derived from one of the output terminals of the switching means to the output line connected therewith; and call control means for performing a call control for packet communication carried out through the switching means and for communicating control information with the switching means and the line interface circuits;

wherein said switching means constructed by a plurality of switching units connected in multiple stages and each of the switching units comprises:

a plurality of pairs of input and output ports, buffer memory means for storing a plurality of packets temporarily, generating means for generating a test packet in response to a control signal received from said call control means through a control bus, receiving means for receiving a test packet read out from said buffer memory means and transmitting the test packet to said call control means through the control bus, and buffer control means for writing input packets received from the input ports and a test packet received from said generating means into the buffer memory means and for selectively reading out packets from the buffer memory means to deliver to one of said output ports or said receiving means specified by the header information of the packet.

20. A switching system according to claim 19, wherein each of said switching units includes a multiplexer for multiplexing the input packets received from the input ports and a test packet received from said generating means to sequentially supply the packets to said buffer memory means and a demultiplexer for selectively distributing the packets read out from the buffer memory means to said output ports and said receiving means; and said buffer control means includes first means for generating a pair of a write address and a pointer address for each packet according to the contents of the header information of the packet output from said multiplexer so as to store the packets in the buffer memory means to form a plurality of logical queues, and second means for generating a read address of each of said logical queue from which a packet is to be read out to one of said output ports or said receiving means.

* * * * *